May 6, 1941.  W. L. STRAWN  2,240,535
LUMP BREAKING APPARATUS
Filed Nov. 14, 1938  2 Sheets-Sheet 1

INVENTOR
Wilbert L. Strawn
BY
ATTORNEY

May 6, 1941.  W. L. STRAWN  2,240,535
LUMP BREAKING APPARATUS
Filed Nov. 14, 1938  2 Sheets-Sheet 2
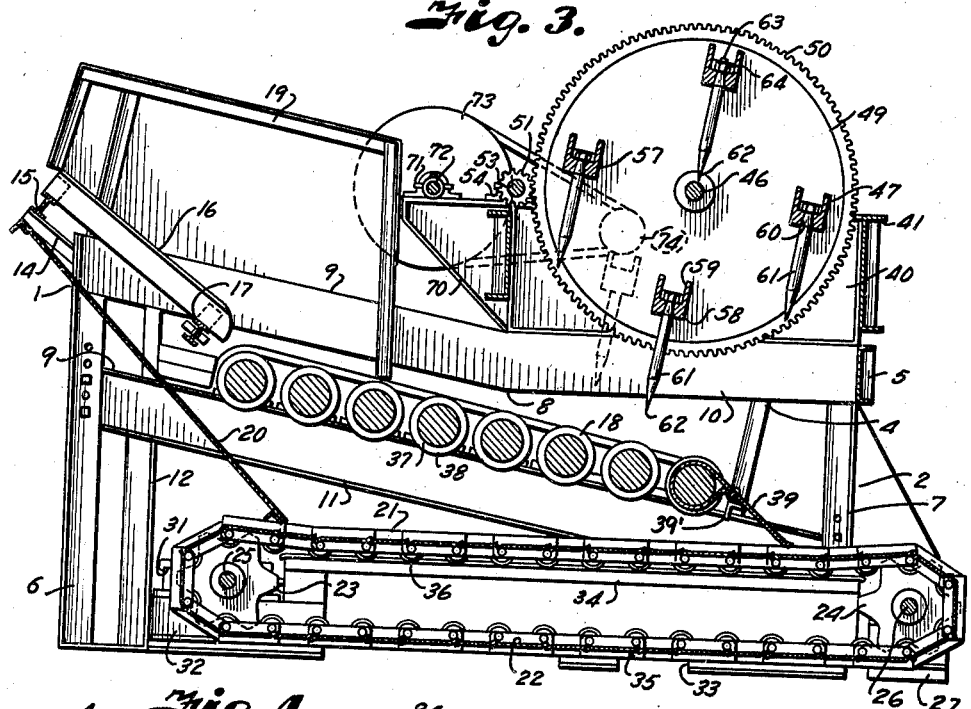
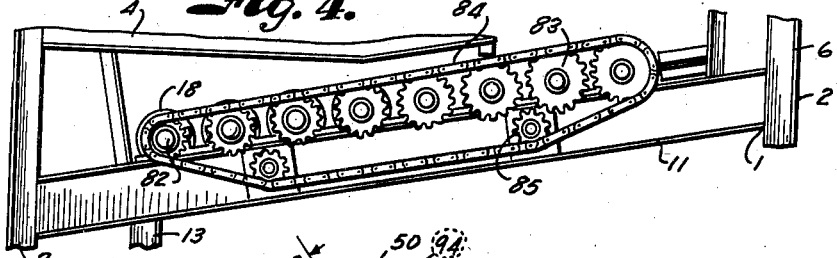
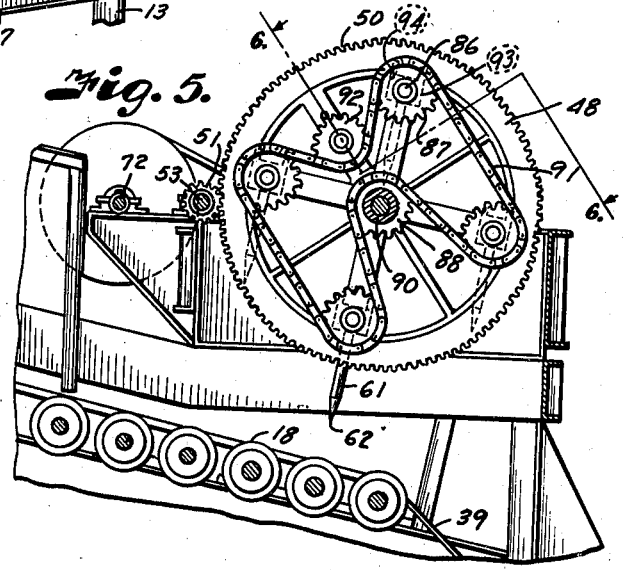
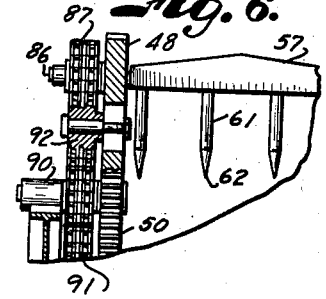
INVENTOR
Wilbert L. Strawn
BY
ATTORNEY Patented May 6, 1941

2,240,535

UNITED STATES PATENT OFFICE 2,240,535

LUMP BREAKING APPARATUS

Wilbert L. Strawn, Kansas City, Mo., assignor to United Iron Works Company, Pittsburg, Kans., a corporation of Delaware Application November 14, 1938, Serial No. 240,251

6 Claims. (Cl. 83—52)

This invention relates to an apparatus for breaking lump materials such as coal, and has for its principal object to provide an apparatus of this character designed to reduce effectively large lump material with a minimum consumption of power and high capacity.

Other objects of the invention are to provide a breaking apparatus constructed to by-pass small lumps that may be carried with the large lumps so that they are not acted upon by the breaking mechanism; to provide a lump breaking apparatus designed to eliminate excessive degradation of the lumps incidental to breaking thereof; to provide an apparatus wherein the material advancing mechanism is synchronized with movement of the coal breaking mechanism; to provide a breaking mechanism consisting of a plurality of picks arranged to penetrate successively and withdraw from the lump material at substantially right angles to the path of travel thereof; to provide for continuous movement of the lump material while being acted upon by the breaking mechanism; and to provide a lump breaking apparatus with grizzly rolls for advancing the lump material into position to be acted upon by the breaking picks and which is timed to freely clear the lump material from under the breaking mechanism.

In accomplishing these and other objects of the invention, I have provided improved details of structure, the preferred forms of which are illustrated in the accompanying drawings, wherein:

Fig. 3 is a longitudinal section through the apparatus on the line 3—3 of Fig. 2.

Fig. 4 is a fragmentary side elevational view illustrating the grizzly roll driving mechanism.

Fig. 5 is a fragmentary section showing a slightly modified form of the invention.

Fig. 6 is a section on the line 6—6 of Fig. 5.

Figure 1:
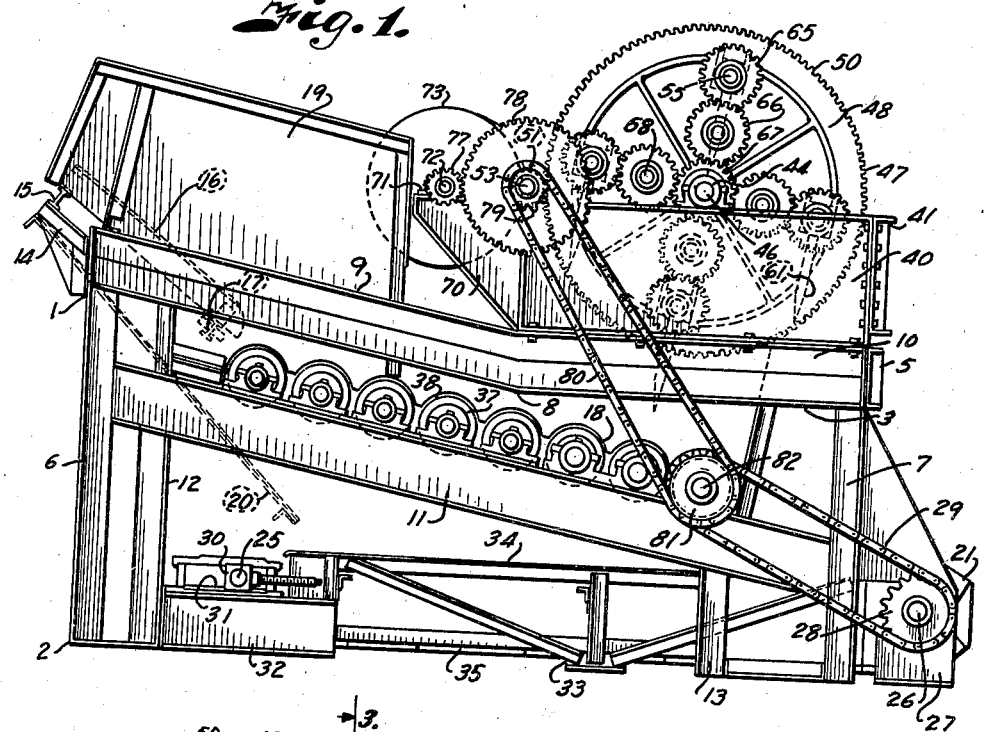
Fig. 1 is a side elevational view of a lump breaking apparatus constructed in accordance with the present invention.

Referring more in detail to the drawings:

1 designates a lump breaking machine embodying the features of the present invention and which includes a frame 2 having sides 3 and 4 connected by cross members 5. The sides of the frame comprise legs 6 and 7 connected at their tops by members 8 having inclined portions 9 sloping from the rear legs 6 toward the median points thereof where they terminate in horizontal portions 10. Connecting the legs 6 and 7, at a point spaced below the members 8, are channel members 11 inclined corresponding to the inclined portion 9 of the upper members. The members 11 are further supported by intermediate legs 12 and 13 spaced inwardly of the legs 6 and 7. Extending rearwardly of the legs 6 are brackets 14 carrying a cross member 15 attaching the rear end of a bar grizzly 16 which has its forward end supported on a similar cross member 17, the bar grizzly being arranged to discharge lump material onto a set of grizzly rolls 18 carried by the members 11. Supported on the inclined portions 9 of the members 8, and at the sides of the bar grizzly, are side boards 19 so as to confine the lump material discharged onto the bar grizzly.

With the arrangement described, the fines and small lumps of material pass between the spaces of the bar grizzly and drop onto an inclined guide apron 20 having its lower end discharging upon a conveyor 21 which carries the fines and lump materials under the roll grizzly and discharges them from the forward end of the machine.

The conveyor 21 may be of any conventional type but is shown as comprising an endless belt 22 carried on pairs of sprockets 23 and 24 that are fixed to cross shafts 25 and 26. The cross shaft 26 is journalled at the forward end of the machine in brackets 27 attached to the legs 7, as best shown in Fig. 1, and carries a sprocket 28 on one end thereof which is driven by a chain belt 29, later described. The shaft 25, supporting the opposite end of the conveyor, is mounted in adjustable bearings 30 that are slidably supported in guides 31 carried on the base portion 32 of the frame, as shown in Fig. 1.

In order to better support the runs of the conveyor, it is provided with side frames 33 having upper and lower guide tracks 34 and 35 mounting rollers 36 carrying the links of the conveyor, as shown in Fig. 3.

Figure 2:
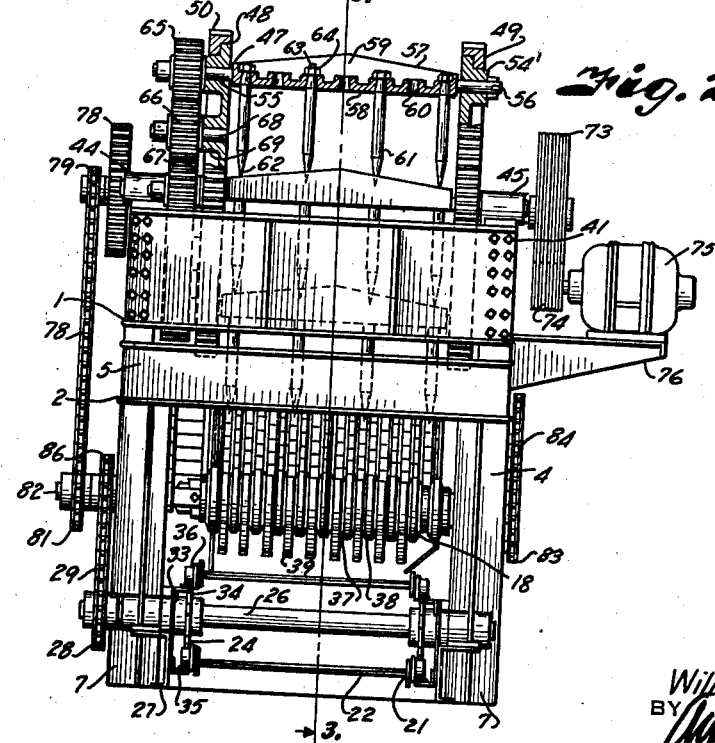
Fig. 2 is an end elevational view of the apparatus and showing a part of the pick carrying gears broken away to illustrate journalling of the pick heads and mounting of the idle gear pinions.

The grizzly rolls are best shown in Fig. 2 and comprise cylindrical bodies 37 having spaced, annular ribs 38 arranged so that the peripheries on one roll are in substantially close relation with the peripheries of the ribs of the adjacent rolls to provide support for the large lumps of material discharged from the bar grizzly. Any fines and small lumps that have not passed through the bar grizzly will drop through grooves of the respective rolls onto the conveyor 21 so as to avoid degradation thereof when the large lumps of coal are acted upon by the breaking mechanism before being discharged off guide bars 39 onto the conveyor 21. The guide bars have ends encircling the grooves of the discharge roller of the roll grizzly, and rest by gravity upon a stop bar 39' so that the opposite ends are supported from contact with the conveyor. In case a large amount of fine material may be carried on the conveyor the bars are adapted to be raised thereby to permit passage thereof.

Supported on the horizontal portions 10 of the members 8 are side members 40 of a supplementary frame 41, which also includes connecting members, as shown in Fig. 3. Journalled in suitable bearings 44 and 45 that are carried upon the side members 40 is a shaft 46 carrying a rotor 47. The rotor 47 includes spaced disks 48 and 49 having ring gears 50 meshing with the teeth of driving pinions 51 carried on a counter-shaft 53 that is journalled in bearings 54 supported on the rear ends of the side members 40. The disks 48 and 49 are fixedly spaced on the shaft 46 so that they are positioned directly above the sides of the roller grizzly and are provided with a series of outer bearings 54'. The bearings 54' journal trunnions 55 and 56 projecting from the ends of pick carrying bars 57. The bars 57 are of channel-like shape, having webs 58 and flanges 59. The webs 58 are provided with a series of spaced, tapered openings 60 located between the flanges 59 to mount the picks 61. The picks 61 are of rod-like form and have tapered heads corresponding to the tapered openings, and pointed or chisel-like terminals 62. The tapered heads of the picks have reduced threaded shanks 63 to accommodate nuts 64 whereby the heads are drawn tightly into the tapered openings 59 to retain securely the picks in fixed position with respect to the carrying bars.

The trunnions 55 project from the bearings 54' and carry planet gears 65 that are fixed thereon and which mesh with idle gears 66 which in turn mesh with a sun gear 67 fixed against rotation to the bearing 44. The idle gears are rotatably mounted on stub shafts 68 carried in bosses 69 formed on the disks in radial alignment with the bearings 54', previously mentioned. The planet, idle and sun gears are so meshed that the picks are kept in perpendicular position with respect to travel of the lump material during actuation of the rotor so that the pointed ends of the respective picks penetrate the lumps of coal at right angles to the travel thereof and advance forwardly therewith in gradually descending movement to cause splitting apart of the lumps into smaller chunks, depending upon the brittleness of the material and the spacing of the picks. While the present drawings show four pick carrying heads, it is obvious that a fewer or greater number may be provided as desired, without departing from the spirit of the invention.

Extending rearwardly of the side members 40 are brackets 70 carrying bearings 71 mounting the ends of a shaft 72. One end of the shaft 72 carries a driven pulley 73 cooperating with a similar pulley 74 on the power shaft of a prime mover, such as a motor 75, the motor 75 being mounted on a suitable bracket 76 projecting laterally from the side of the frame 2. The opposite end of the power shaft carries a pinion gear 77 which meshes with a gear 78 fixed to the counter-shaft 53. Also fixed to the counter-shaft is a sprocket 79 driving a chain 80 that operates over a sprocket 81 fixed to the projecting end of the shaft 82 of the forwardmost grizzly roller, as shown in Fig. 1, to effect rotation thereof in synchronism with the rotor. The shafts of the other grizzly rolls are respectively provided at the opposite side of the machine with sprockets 83 of differential diameters. Operating over the respective sprockets 83 is the upper run of an endless chain belt 84 having its lower run kept from engagement with the respective sprockets by idler sprockets 85 attached to the adjacent channel 11, as shown in Fig. 4. The sizes of the sprockets are such that the respective grizzly rolls have increased speed toward the delivery end of the roll grizzly so that the roll grizzly is kept clear of lump material which might otherwise tend to collect under the breaking mechanism.

The belt 29 driving the conveyor 21 operates over a driving sprocket 86, also carried on the projecting end of the roller shaft 82, alongside the sprocket 81.

In the modified form of the invention shown in Fig. 5, the trunnions 86 of the pick carrying bars are provided with sprockets 87, and operating thereover, and over a sun sprocket 88 fixed to the bearing 90 which mounts that end of the pick carrying rotor, is an endless chain 91. The chain 91 is tightened about the respective sprockets by an idler sprocket 92 adjustably mounted on the rotor. The chain 91 retains the sprockets in position so that by revolution of the rotor the picks are retained in their same relative position with respect to the path of travel of the lump material to be broken thereby. Otherwise the construction shown in Fig. 5 is the same as that illustrated and described in the first form of the invention.

In using a machine constructed and assembled as described, lump material, such as coal, is delivered onto the bar grizzly 16. The fines and small lumps of material drop between the bars of the grizzly and are guided by the apron 20 onto the upper run of the conveyor 21. The lumps of material too large to pass through the grizzly are delivered upon the grizzly rolls for movement under the breaking mechanism. The grizzly rolls, being respectively driven at gradually increasing speeds toward the delivery end thereof, spread the lump material thereover and prevent bunching thereof under the breaking mechanism. Upon rotation of the rotor the series of picks are caused to descend successively into piercing contact with the lump material moved across the grizzly, splitting the lump material into small chunks. As the picks descend, as shown by the dotted lines in Fig. 3, they are simultaneously advanced with an accelerated forward speed incidental to revolution of the rotor in synchronism with movement of the coal, but by the time the picks engage the coal, (see the dotted line position, Fig. 3) the picks are advanced at substantially the speed of the coal as effected by the immediately underlying grizzly rolls which are actuated in timed relation with the peripheral speed of the rotor. When the picks reach bottom center position and have split the coal, they gradually retract and are kept perpendicular with the path of travel of the broken lump material as it is discharged from off the end of the roll grizzly onto the conveyor 21. It is true that the relative forward movement of the picks is gradually retarded, but by this time the picks are out of contact with the coal.

Attention is directed to the fact that the perpendicular engagement and withdrawal of the picks with respect to the coal and the forward advancement thereof corresponding to the speed of the lump material, effect breakage thereof without undue degradation. Also since the fines and small lumps of coal are by-passed around the breaking mechanism, they are not further reduced incidental to operation of the breaking mechanism.

From the foregoing it is apparent that I have provided a simple and efficient machine which is especially adapted for the breaking of coal and similar lump materials.

What I claim and desire to secure by Letters Patent is:

1. An apparatus for breaking lump material including a supporting frame, a plurality of grizzly rolls journalled on the frame, means for driving the grizzly rolls to effect movement of the lump material across the same in one direction, a lump breaking mechanism including a plurality of picks, means supporting said lump breaking mechanism over the grizzly rolls, means for moving said picks into and out of splitting contact with said lumps of material moved across the grizzly rolls for cooperation therewith, means for effecting continuous advance of the picks over the grizzly rolls in the direction of advance of the lump material by the grizzly rolls, means for retaining the picks in perpendicular position with respect to the grizzly rolls during said movement, and means for actuating said pick advancing means in substantial synchronism with movement of said lump material over said grizzly rolls.

2. An apparatus for breaking lump material including a frame, a plurality of grizzly rolls journalled on the frame, means for driving the grizzly rolls to effect movement of lump material across the same in one direction, a lump breaking mechanism including a rotor, pick carrying members journalled in the rotor, picks fixed to said members, means rotatably mounting the rotor on said frame in cooperating relation with said grizzly rolls, means for effecting rotation of the rotor in the direction of advancement of said lump material, planet members fixed to said pick carrying members, a sun member having fixed support in the axis of said rotor, and means connecting the sun member with the planet members whereby the planet members are caused to journal said pick carrying members in said rotor, said planet members being positioned relatively to the sun member to maintain substantially perpendicular position of said picks relatively to the lump advancing grizzly rolls during actuation of said rotor.

3. In an apparatus of the character described, a supporting frame, a plurality of grizzly rolls journalled in the frame, a driving member fixed in driving relation with each of the grizzly rolls and having differential diameters, driving means interconnecting the driving members to effect rotation of the grizzly rolls at progressively increasing speeds to effect accelerated movement of lump material delivered thereon, a rotor carried by the frame above selected grizzly rolls, picks carried by the rotor, means retaining said picks in perpendicular relation with the path of travel of the lump material, and a driving connection between the rotor and the grizzly rolls to advance the picks across said selective grizzly rolls at substantially the speed of the lump material while being advanced by said selected grizzly rolls.

4. An apparatus of the character described, including a supporting frame, a plurality of grizzly rolls journalled on the supporting frame, means driving the grizzly rolls at differential speeds to effect accelerated movement of lump material advanced across the grizzly rolls, a rotor journalled on the frame over the grizzly rolls, pick carrying members journalled in said rotor, picks carried by said members, means for rotating the rotor including means for retaining the picks in perpendicular relation with the travel of the lump material, and a driving connection between said roll driving means and the rotor rotating means, said driving connection being timed to effect advancement of the picks continuously in successive order in substantially timed relation with movement of the lump material across the immediately underlying grizzly rols.

5. In an apparatus of the character described, a supporting frame, a plurality of grizzly rolls journalled on the supporting frame, means driving the grizzly rolls at differential speeds to effect accelerated movement of lump material advanced across the grizzly rolls, a rotor, means mounting the rotor over said accelerated grizzly rolls, pick carrying members journalled in said rotor, picks carried by said members, a sun gear having fixed mounting in the axis of the rotor, planetary gearing on the rotor connecting the sun gear with said members to effect projection and withdrawal of said picks into splitting contact with the lump material moved across the grizzly rolls, actuating means for the rotor, and means connecting said rotor actuating means with the accelerated grizzly roll driving means.

6. In an apparatus of the character described, a supporting frame, a plurality of grizzly rolls journalled on the supporting frame, means driving the grizzly rolls at differential speeds to effect accelerated movement of lump material advanced across the grizzly rolls, a rotor, means mounting the rotor over said grizzly rolls, pick carrying members journalled in said rotor, picks carried by said members, a sun gear having fixed mounting in the axis of the rotor, planetary gearing on the rotor connecting the sun gear with said members to effect projection and withdrawal of said picks into splitting contact with the lump material moved across the grizzly rolls, actuating means for the rotor, and actuating means for rotating the rotor in timed relation with said accelerated rolls whereby the picks are advanced at the speed of the lump material when acted upon by said picks.

WILBERT L. STRAWN.